(12) United States Patent
Luchsinger et al.

(10) Patent No.: US 7,089,804 B2
(45) Date of Patent: Aug. 15, 2006

(54) METHOD FOR THERMAL FLOW MEASUREMENT WITH NON CONSTANT HEATING PULSES

(75) Inventors: Rolf Luchsinger, Uster (CH); Daniel Matter, Brugg (CH); Philippe Prétre, Baden-Dättwil (CH); Thomas Kleiner, Fislisbach (CH)

(73) Assignee: ABB Research LTD, Zurich (CH)

( * ) Notice: Subject to any disclaimer, the term of this patent is extended or adjusted under 35 U.S.C. 154(b) by 0 days.

(21) Appl. No.: 10/501,143

(22) PCT Filed: Jan. 9, 2003

(86) PCT No.: PCT/CH03/00005

§ 371 (c)(1),
(2), (4) Date: Feb. 11, 2005

(87) PCT Pub. No.: WO03/058178

PCT Pub. Date: Jul. 17, 2003

(65) Prior Publication Data

US 2005/0115313 A1  Jun. 2, 2005

(30) Foreign Application Priority Data

Jan. 14, 2002  (EP) ............... 02000767

(51) Int. Cl.
 *G01F 1/00* (2006.01)
(52) U.S. Cl. ...................................... 73/861
(58) Field of Classification Search ........ 73/204.17, 73/204.14, 861
See application file for complete search history.

(56) References Cited

U.S. PATENT DOCUMENTS 3,719,083 A * 3/1973 Morris et al. ............ 73/204.14
3,905,230 A * 9/1975 Calvet et al. ................. 73/755
4,501,145 A    2/1985 Boegli et al.

FOREIGN PATENT DOCUMENTS

EP     0 180 974 A1   5/1986
EP     0 698 786 A1   2/1996

OTHER PUBLICATIONS

Abstract of 02000767.0.
European Patent Office Search Report.
International Search Report and English Translation.

* cited by examiner

*Primary Examiner*—Jewel V. Thompson
(74) *Attorney, Agent, or Firm*—Buchanan Ingersoll PC

(57) ABSTRACT

The invention relates to a process and a device for thermal measuring the flow rate (v) of a fluid (3). In conventional thermal sensors the heating power P is supplied in the form of rectangular pulses. According to the invention, the sensor means (1b) are supplied by a heating control (2b) with non-constant heating pulses having a sublinear build-up dynamics P(t). Thereby, a nonlinear behaviour of the threshold value time ($t_S$), until a threshold value temperature ($T_m$) is reached, as a function of the flow rate (v) can at least partially be compensated. Embodiments concern inter alia a build-up dynamics P(t) proportional to $t^m$ and/or to a time-independent amplitude factor $(1+R_S/R_I)^{-1}$, wherein m is a Reynolds-number-dependent exponent and $R_S$, $R_I$ are thermal transfer resistances. The advantages are an improved precision, a shorter measuring time and an enlarged measuring range for the flow rate v.

15 Claims, 2 Drawing Sheets

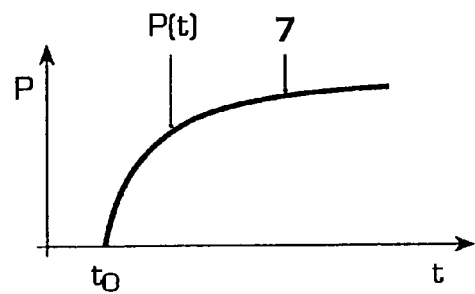
Fig. 3a
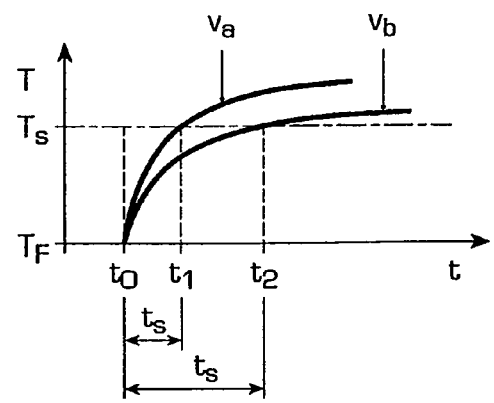
Fig. 3b
Fig. 3c
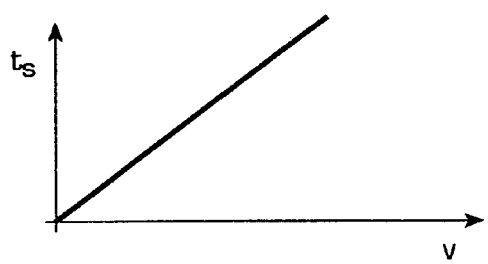
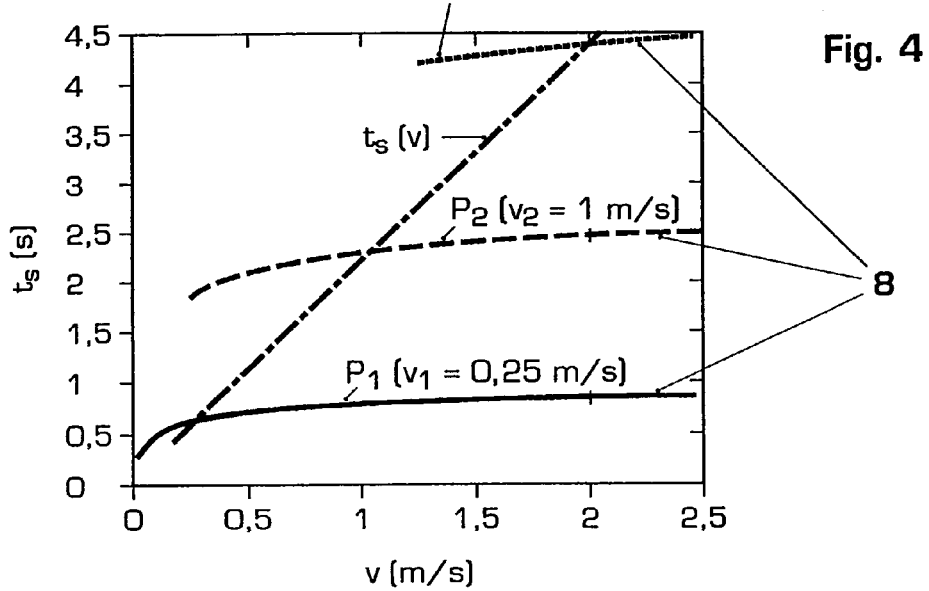
Fig. 4

METHOD FOR THERMAL FLOW MEASUREMENT WITH NON CONSTANT HEATING PULSES

TECHNICAL FIELD

The present invention relates to the field of measuring flows of gas or fluid using thermal sensors. It is based on a method and a sensor for mass flow measurement according to the preamble of the independent claims.

PRIOR ART

U.S. Pat. No. 4,501,145 discloses a generic method and device for thermal flow rate or flow velocity measurement. Here a sensor is heated with a heating pulse of constant power, at least one build-up time is measured until a preset temperature threshold is reached and from this a fluid parameter, such as e.g. the flow rate, dependent on the heat transfer coefficient is measured. The disadvantage is that the rise in temperature proves to be more and more undifferentiated with increasing flow rate and comes to saturation, so that adequate measuring sensitivity is achieved only in a restricted measuring range of flow rates. In addition, the heating power or heating power and the temperature threshold are to be carefully matched to one another and to the desired flow rate measuring range.

EP 0 180 974 discloses a process and a device for measuring flow rates or mass flows. Thereby, flow-dependent sets of characteristic curves are determined for the unstationary probe temperature evolution at a constant heating power and are related to the flow rate, in that temperatures are measured at preset times or time intervals until predetermined temperature threshold values are reached. The disadvantage is that the flow rate measuring range is restricted to the evaluable ranges of the sets of characteristic curves on account of the again decreasing temperature resolution at high flow rates.

DESCRIPTION OF THE INVENTION

The object of the present invention is to provide a method and a device for pulsed mass flow measurement with an improved measuring sensitivity in an enlarged measuring range. This object is achieved according to the invention by the features of the independent claims.

In a first aspect the invention relates to a method for measuring a flow rate or a mass flow of a fluid, in particular for measuring hot water supply in the private, public or industrial sector, in which the fluid is guided over a sensor element, which has a heating means for inducing temperature changes and a sensor means for determining its temperature, wherein at least from time to time the heating means is operated with a heating power in the form of heating pulses and a flow-dependent threshold value time is measured at the sensor means until a preset temperature threshold value is reached, wherein during at least some of the heating pulses a non-constant heating power with a substantially sublinear build-up dynamics as a function of time is selected in order to at least partially compensate a nonlinear behaviour of the threshold value time as a function of the flow rate or flow velocity. A sublinear build-up dynamics means that during a heating pulse the heating power is a function of time with a monotonously decreasing first time differentiation. Substantially sublinear means that short-term deviations therefrom, e.g. a short-term increasing time differentiation, is tolerable, as long as the build-up dynamics remains globally, i.e. under formation of sectionwise average values over the entire heating pulse, sublinear and has a first time differentiation decreasing from section to section. Such a flattening increase in heating pulse output leads to the desired effect, that both low and high flow rates can be determined with great precision and at the same time relatively short measuring duration. With the method the measuring range can therefore be expanded, the measuring precision can be increased, the measuring time can be shortened and, if required, the measuring repetition rates can be increased. In addition, it is not necessary or uncritical to adapt the heating power to the temperature threshold or the flow rates-measuring range, because the temperature threshold is reached in any case owing to the increase in heating power.

In a first embodiment the build-up dynamics is varied as a function of time and optionally of the flow rate itself to be measured, such that the threshold value time is a linear function of the flow rate at least by approximation, i.e. in particular at least on discrete flow rate values. Due to the linearity a measuring sensitivity substantially uniform over the entire flow rate measuring range is reached. At the same time smaller local deviations from the linearity are tolerable. The linear measuring characteristics can be achieved, if required, at least pointwise over the entire measuring range, in that adapted build-up behaviours of the heating pulse power are used for different flow rate partial measuring ranges.

In the embodiment according to Claim 4 such an adapted build-up dynamics is achieved by the flow rate-dependent amplitude factor. Thereby, a linear characteristics of the threshold value time as a function of the flow rate is realised at least point-wise and independently of the first thermal transfer resistance between heating means and sensor element surface.

The advantage of the embodiment according to Claim 3 is a particularly simple and easily implementable time dependence of the build-up dynamics of the heating power. This time dependence is suited in particular to the improved linearisation of the threshold value time as a function of the flow rate, the less the first thermal transfer resistance is.

The advantage of the embodiment according to Claim 5 is that for a simple cylindrical form of the sensor element an exact flow dependency of the second thermal transfer resistance can be given.

The advantage of the embodiments according to Claims 6 and 7 is that the implicit problem of the dependency of the heating power on the variable to be measured is resolved simply and reliably by in-advance determined calibration curves and by estimation or a-priori knowledge of the presumable flow rate.

The advantage of the embodiment according to Claim 8 is that with negligible first thermal transfer resistance the linear relation between threshold value time and flow rate can be calculated over the entire flow rate measuring range validly and exactly.

In a second aspect the invention relates to a mass flow sensor for detecting a flow rate or a mass flow of a fluid according to the above-described process. The sensor comprises a sensor element with a heating means and a sensor means for thermal measuring in a fluid and a control and evaluating processor unit with a heating control for generating heating pulses for the heating means and a measuring device for evaluating the thermal measurement and for determining a flow rate or a mass flow from a flow-dependent threshold value time until a preset temperature threshold value at the sensor means is reached, wherein the heating control comprises means for generating a non-constant heating power with a substantially sublinear build-up dynamics as a function of the time, and the control and evaluating processor unit has means for at least partial compensation of a nonlinear behaviour of the threshold value time as a function of the flow rate.

The advantage of the embodiments according to claims 10 and 11 is a particularly simple and precise sensor control and detection of measuring variables.

Further embodiments, advantages and applications of the invention will emerge from the dependent claims as well as from the following description and the figures.

BRIEF DESCRIPTION OF THE DRAWINGS

FIGS. 3a, 3b, 3c illustrate pulsed operation of a mass flow sensor with inventive, non-rectangular heating pulses; and FIG. 4 illustrates a set of calibration curves of the threshold value time as a function of the flow rate for three flow-dependent heating powers.

In the figures identical parts are designated with the same reference numerals.

WAYS OF IMPLEMENTING THE INVENTION

Figure 1:
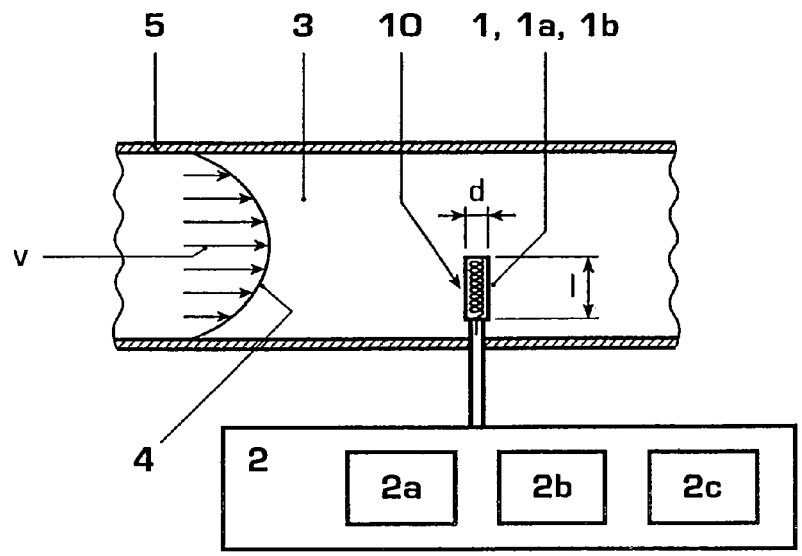
FIG. 1 illustrates in cross-section a pipe flowed through or a flow channel with an inventive mass flow sensor for operation with non-rectangular heating pulses.

FIG. 1 illustrates a thermal mass flow sensor 1, 2, which comprises a sensor element 1 arranged in a flow channel or pipe 4 and a control and evaluating processor unit 2. A fluid 3, e.g. a liquid 3 or a gas 3, flows in the pipe 4 with a flow or rate profile 5. The sensor element 1 is subjected to a flow rate v to be measured. The sensor element 1 has a heating means 1a for inducing temperature changes and a sensor means 1b for determining its temperature.

Figure 2A:
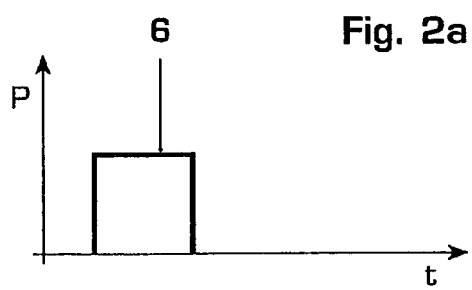
FIGS. 2a, 2b, 2c, 2d illustrate pulsed operation of a mass flow sensor with rectangular heating pulses according to the prior art.
Figure 2B:
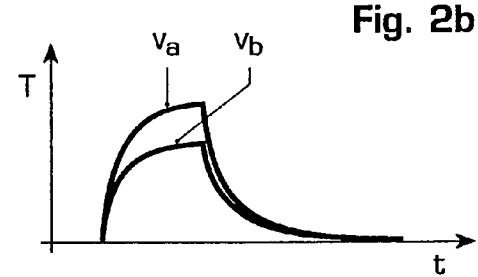
Figure 2C:
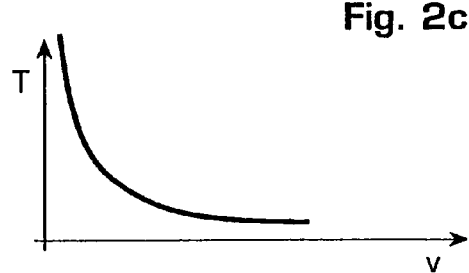
Figure 2D:

According to FIGS. 2a to 2d, it is known to operate the heating means 1a with a heat output or heating power P in the form of constant heating pulses 6, to measure a flow-dependent temperature change T at or on the sensor element 1, and from this—with a given constant, i.e. rectangular heating power—to draw conclusions about the flow rate v or the mass flow. Instead of temperatures T at a fixed measuring time t, also flow-dependent threshold value times $t_S$ can be evaluated until a preset temperature threshold value $T_S$ is reached. FIG. 2b shows by way of example two time-dependent temperature behaviours T(t) for two flow rates $v_a<v_b$. FIG. 2c shows the resulting measuring curve or characteristics of the temperature at a specific time as a function of the flow rate T(v), which has a strongly decreasing measuring sensitivity for increasing flow rates v. The measuring precision and the measuring range are thereby restricted in a very unfavourable manner. FIG. 2d shows the corresponding strongly nonlinear behaviour of the thermal measurement of the threshold value time $t_S$ as a function of the flow rate v. The nonlinear $t_S(v)$ characteristics has a number of drawbacks. In the event of low flow rates v, the measuring sensitivity is minimal. At high flow rates v the theoretically high measuring sensitivity cannot be capitalised on, because the threshold value times $t_S$ can be determined only with major uncertainty from the flat, glancing intersections between the temperature rise T(t) and the threshold value temperature $T_S$. Moreover, setting the threshold value temperature $T_S$ is highly critical. If $T_S$ is chosen to be low, the threshold value times $t_S$ become short and accordingly $t_S(v)$ becomes very flat and the measuring resolution for small v becomes poor. If $T_S$ is chosen to be high, the nonlinear, over-proportional increase of $t_S(v)$ already starts at low rates or velocities v and shows a steep incline because of the flat intersections. In the worst case scenario $T_S$ is not reached and the flow rate v can no longer be measured. Also in the permitted measuring range for v a subtle choice and, if required, repeated adapting of $T_S$ is required to obtain a useful measuring range with an evaluable measuring characteristics $t_S(v)$.

In FIGS. 3a to 3c the method according to the present invention is explained. At the time $t_o$ a time-dependent heating power signal P(t), possibly dependent on the selected flow rate range, is started and is increased according to non-rectangular, sublinear build-up dynamics P(t). Such heating pulses 7 are supplied to the heating means 1a at least from time to time (not illustrated). Preferably, the flow-dependent times $t_1$, $t_2$ are measured until a preset temperature threshold value $T_S$ is reached and the flow-dependent threshold value times $t_S=t_1-t_0$ for $v_a$ and $t_S=t_2-t_0$ for $v_b$ are determined therefrom. In contrast to FIG. 2c, $t_S(v)$ is a monotonously increasing function. On account of the inventive flattening of the build-up dynamics P(t) the interfering saturation behaviour in T(t) (FIG. 2c) or the interfering nonlinear behaviour in $t_S(v)$ (FIG. 2d) can now extensively be compensated, resulting in an easily evaluable measuring function $t_S(v)$ that is useful over a wide measuring range of flow rates v. Due to the expanded measuring range the mass flow sensor or flow rate sensor is particularly suited to measuring hot water supply in the private, public or industrial sector.

A detailed analysis for an optimal configuration of the heating power pulses 7 is given hereinbelow. In a simple thermal model the sensor element 1 has a heat capacity $C_S$, a first thermal transfer resistance $R_S$ between the heating means 1a and a surface 10 of the sensor element 1 and a second thermal transfer resistance $R_f=(h \cdot A)^{-1}$ between the surface 10 of the sensor element 1 and the fluid 3, wherein h is a flow-dependent heat transfer coefficient between the sensor element 1 and the fluid 3 and A is a contact surface between the sensor element 1 and the fluid 3. According to VDI heat atlas (VDI Guidelines 3522, VDI Measuring Handbook I, VDI-Verlag GmbH, Düsseldorf 1987), the heat transfer coefficient h is given, for a cylindrical, laterally flow-exposed sensor element 1 with diameter d, by the equation $$h=(\lambda/d) \cdot 1.11 \cdot C \cdot Pr^{0.31} \cdot Re^m \quad (G1)$$

wherein λ is a heat conductivity of the fluid 3, C is a parameter and m an exponent, that both depend on a Reynolds number Re of the fluid 3, and Pr is a Prandtl number of the fluid 3. With $Pr=\eta \cdot c_P/\lambda$, with η being a dynamic viscosity of the fluid 3 and $c_P$ being a specific heat of the fluid 3, and $Re=\rho \cdot d \cdot v/\eta$, with ρ being a density and v being a flow rate or velocity of the fluid 3, h is proportional to $v^m$ and the following is valid $$R_f=\gamma \cdot v^{-m} \quad (G2)$$

wherein $\gamma=d/(A \cdot \lambda \cdot 1.11 \cdot C \cdot Pr^{0.31} \cdot (\rho \cdot d/\eta)^m)$ is a constant. For the Reynolds number-dependent parameters C and m tabulated values can be used, e.g. C=0.615 and m=0.466 for Reynolds numbers between 40 and 4000, which characterise a laminar flow of the fluid 3.

In the following a numerical example is given for water at room temperature: $\eta=1 \cdot 10^{-3}$ Ns/m², ρ=998.2 kg/m³, $\lambda=0.598$ W/(m·K) and $C_P=4182$ J/(kg·K). Then $Pr=6.993$ and for $d=1.9$ mm $Re=1897 \cdot v$. For rates v between 0.02 m/s and 2 m/s the parameters C and m assume the values $C=0.615$ and $m=0.466$. This leads to heat transfer coefficients h between 2140 W/(m²·K) at $v=0.02$ m/s and 18270 W/(m²·K) at $v=2$ m/s and corresponding second thermal transfer resistances $R_I=6.5$ K/W at $v=0.02$ m/s and $R_I=0.7$ K/W at $v=2$ m/s for a sensor element 1 having a length of $l=12$ mm.

With a time-dependent and speed-dependent build-up dynamics P(t) of the heating power according to the equation $$P(t)=P_0 \cdot (1+R_S/R_I)^{-1} \cdot t^\alpha \quad (G3)$$

wherein $P_0$ is a heating power factor and $\alpha$ is an exponent of the build-up dynamics P(t), the above-mentioned nonlinear, in particular over-proportional behaviour of the measuring characteristics $t_S(v)$ can approximately be compensated or even the measuring characteristics $t_S(v)$ can be linearised at least partially or pointwise at sampling points. In particular $t_S > \tau$ is valid for measuring times or threshold value times, in particular $t_S > 10 \cdot \tau$, with $\tau = C_S \cdot R_S$ $$T(t)=P_0 \cdot t^\alpha \cdot R_I + T_F, \quad (G4)$$

wherein $T_F$ designates the undisturbed fluid temperature. The same heating behaviour T(t) is obtained in the approximation $R_S < R_I$, in particular $R_S/R_I < 0.1$ and particularly preferred $R_S/R_I < 0.01$, with a speed-independent heating pulse output $P(t) = P_0 \cdot t^\alpha$.

Assuming a choice of the heating power exponent $\alpha = m$, $$T(t)=P_0 \cdot \gamma \cdot (t/v)^m + T_F \quad (G5)$$

is valid, and the threshold value time $t_S$ for a given temperature threshold value $T_S$ is expressed by the equation $$t_S(v)=(T_S-T_F)^{1/m} \cdot (P_0 \cdot \gamma)^{-1/m} \cdot v. \quad (G6)$$

The measuring duration or threshold value time $t_S$ is also a linear function of the flow rate v to be determined, as shown in FIG. 3c, if the heating power exponent a is identical to the rate exponent m of the heat transfer coefficient h, and, in particular, if the first thermal transfer resistance $R_S$ of the sensor element 1 is negligibly small compared to the second thermal transfer resistance $R_I$ to the fluid 3. The latter condition is satisfied if $R_S/R_I < 1$, preferably $R_S/R_I < 0.1$ and particularly preferred $R_S/R_I < 0.01$.

The build-up dynmics P(t) is also selected advantageously proportionally to $t^m$, wherein the exponent m is chosen smaller than 1, in particular $m \leq 0.5$ and particularly preferred $m=0.466$ for a Reynolds number between 40 and 4000. The heating power exponent $\alpha$ can also be selected identical to m only by approximation, i.e. $\alpha \approx m$, in order to achieve the desired, at least approximate compensation of the nonlinear behaviour of $t_S(v)$ at high flow rates v.

The build-up dynamics P(t) is furthermore selected advantageously proportional to a time-independent amplitude factor $(1+R_S/R_I)^{-1}$.

In the general sense the heating power according to equation (G3) is varied via $R_I$ also in dependence on the flow rate to be measured or the presumed measuring range of the flow rate v to be measured, in such a way that there is again a linear relationship between the threshold value time $t_S$ and the flow rate v. This linear relationship is also independent from $R_S$, if $R_S$ assumes a non-negligible value relative to $R_I$.

In this case the measuring procedure is preceded by a calibration and a selection of a matching calibration curve 8 according to FIG. 4. In a first procedural step discrete values of the flow rate $v_i$ are selected and associated build-up behaviours $P_i(t)$ of the heating power are determined, wherein $i=1, 2, 3, \ldots$, is an index. In a second step a set of calibration curves 8 of the threshold value time $t_S$ is determined as a function of the flow rate v for the build-up behaviours $P_i(t)$. In a third step, on account of a previously measured flow rate or based on a-priori information about the presumed flow rate, a preferred calibration curve 8 is selected according to a desired measuring precision for the flow rate v and according to a desired measuring duration $t_S$, and is used to determine the flow rate v, or, starting from the calibration curve 8 associated with the lowest flow rate value $v_{i=1}$ and rising successively to higher flow rates values $v_{i>1}$ or by estimating in a single step, a preferred calibration curve 8 is determined according to a desired measuring precision for the flow rate v and according to a desired measuring duration $t_S$, and is used to determine the flow rate v.

This gradual procedure is shown in FIG. 4 for three calibration curves 8, which were obtained with three heating power curves $P_1(t)$ at $v_1=0.25$ m/s, $P_2(t)$ at $v_2=1$ m/s and $P_3(t)$ at $v_3=2$ m/s. A linear measuring characteristics $t_S(v)$ is given at least pointwise by the calibration curves 8. At the same time typical values of $R_S \approx 35$ W/K and $R_I \approx 5$ W/K were assumed. Even with such a disadvantageous size distribution of the thermal transfer resistances, namely $R_S >> R_I$, the method according to invention can still be used to carry out a precise and fast measurement in a large flow rate measuring range. In principle, very low flow rates $v<1$ m/s can still be measured also with the calibration curve at $v_3=2$ m/s. With the method according to the invention, however, the measuring duration $t_S$ can substantially be shortened and the heat energy requirement can be lowered accordingly.

Advantageously a number and distribution of the calibration curves 8 are selected according to a desired measuring resolution and a desired measuring range of the flow rate v.

FIG. 1 shows the device for implementing the above-mentioned method. Here 2a designates a heating control for generating heating pulses 7 for the heating means 1a and 2b designates a measuring device for evaluating the thermal measurement and for determining a flow rate or flow velocity v or a mass flow from a flow-dependent threshold value time $t_S$ until a preset temperature threshold value $T_S$ is reached at or on the sensor means 1b. According to the invention the heating control 2b comprises means for generating a non-constant heating power P with a substantially sublinear build-up dynamics P(t) as a function of the time t, and the control and evaluating processor unit 2 comprises means for at least partial compensation of a nonlinear behaviour of the threshold value time $t_S$ as a function of the flow rate v.

In a preferred embodiment the control and evaluating processor unit 2 comprises hardware and/or software for generating a build-up dynmics P(t) proportional to $t^m$ and/or proportional to a time-independent amplitude factor $(1+R_S/R_I)^{-1}$. In addition, the control and evaluating processor unit 2 can have calibration means 2c for performing the first and second procedural steps of the above-mentioned calibration procedure. Preferably the sensor element 1 comprises an electric heating wire 1a, 1b with a temperature-dependent resistance, which can be run simultaneously as heating means 1a and as sensor means 1b.

The inventive method and the device for implementing the method are suitable for arbitrary fluids 3, in particular for liquids 3 or gases 3.

Legend

1 sensor element
1a heating means
1b sensor means
2 control and evaluating unit
2a heating control
2b measuring device
2c calibration means
1, 2 flow rate sensor, mass flow sensor
3 fluid; liquid, gas
4 flow profile
5 flow channel, pipe
6 rectangular constant heating pulse (prior art)
7 sublinear non-constant heating pulse
8 calibration curves
10 surface of the sensor element
P heating power, heat output
P(t), $P_i(t)$ build-up behaviour, increase
T temperature
$T_S$ threshold value temperature
$T_F$ undisturbed fluid temperature
t time, time variable
$t_0, t_1, t_2$ times
$t_S$ threshold value time
v, $v_i$ flow rate

The invention claimed is:

1. A method for measuring a flow rate (v) or a mass flow of a fluid, in particular for measuring hot water supply in the private, public or industrial sector, in which the fluid is guided over a sensor element, which has a heating means for inducing temperature changes and a sensor means for determining its temperature, wherein at least from time to time the heating means is operated with a heating power (P) in the form of heating pulses and a flow-dependent threshold value time ($t_S$) is measured at the sensor means until a preset temperature threshold value ($T_S$) is reached, wherein during at least some of the heating pulses a non-constant heating power (P) with a substantially sublinear build-up dynamics (P(t)) as a function of time (t) is selected in order to at least partially compensate a nonlinear behaviour of the threshold value time ($t_S$) as a function of the flow rate (v).

2. The method as claimed in claim 1, wherein the build-up dynamics (P(t)) as a function of the time (t) and, if required, of the flow rate (v) to be measured is varied itself such that the threshold value time ($t_S$) is a linear function of the flow rate (v) at least on discrete flow rate values ($v_i$).

3. The method as claimed in any one of the preceding claims, wherein the build-up dynamics (P(t)) is selected to be proportional to $t^m$, wherein m=an exponent dependent on a Reynolds number of the fluid which is lower than 1, in particular m<0.5 and particularly preferred m=0.466 for a Reynolds number of the fluid (3) between 40 and 4000.

4. The method as claimed in claim 3, wherein a cylindrical sensor element, against which the fluid is transversely flown, is selected with a heat transfer coefficient h proportional to $v^m$ and with a second thermal transfer resistance $R_f = \gamma \cdot v\gamma^{-m}$ being a constant.

5. The method as claimed in claim 3 wherein
 a) in a first step discrete values of the flow rate ($v_i$) are selected and corresponding build-up dynamics $P_i(t)$ of the heating power are determined, wherein i=1, 2, 3, . . . is an index,
 b) in a second step a set of calibration curves of the threshold value time ($t_S$) as a function of the flow rate (v) is determined for the build-up dynamics ($P_i(t)$) and c) in a third step, on account of a previously measured flow rate or based on a-priori information about the presumed flow rate, a preferred calibration curve is selected according to a desired measuring precision for the flow rate (v) and according to a desired measuring duration ($t_S$), and is used to determine the flow rate (v), or
 d) in a third step, starting from the calibration curve associated with the lowest flow rate value ($v_{i=1}$) and rising successively to higher flow rate values ($v_{i>}^1$) or by estimating in a single step, a preferred calibration curve is determined according to a desired measuring precision for the flow rate (v) and according to a desired measuring duration ($t_S$), and is used to determine the flow rate (v).

6. The method as claimed in claim 5, wherein a number and distribution of the calibration curves are selected according to a desired measuring resolution and to a desired measuring range of the flow rate (v).

7. The method as claimed in claim 3, wherein $R_S/R_f<1$, preferably $R_S/R_f<0.1$ and particularly preferred $R_S/R_f<0.01$, and a heating power factor $P_0$ are selected and the threshold value time ($t_S$) is calculated as an exact linear function of the flow rate (v) according to an equation $$t_S(v) = (T_S - T_F)^{1/m} \cdot (P_0 \cdot \gamma)^{-1/m} \cdot v,$$

wherein $\gamma$ is a constant and $T_F$ is an undisturbed fluid temperature.

8. A device for carrying out the method as claimed in claim 5, comprising a sensor element with a heating means and a sensor means for thermal measuring in a fluid and a control and evaluating processor unit with a heating control for generating heating pulses for the heating means and a measuring device for evaluating the thermal measurement and for determining a flow rate (v) or a mass flow from a flow-dependent threshold value time (t) until a preset temperature threshold value ($T_S$) at the sensor means reached, wherein
 a) the heating control comprises means for generating a non-constant heating power (P) with a substantially sublinear build-up dynamics (P(t)) as a function of the time (t), and
 b) the control and evaluating processor unit has means for at least partial compensation of a nonlinear behaviour of the threshold value time ($t_S$) as a function of the flow rate (v).

9. The device as claimed in claim 8, wherein
 a) the control and evaluating processor unit comprises hardware and/or software for generating a build-up dynamics (P(t)) proportional to $t^m$ and/or to a time-independent amplitude factor $(1+R_S/R_f)^{-1}$, wherein t is a time variable, m is an exponent dependent on a Reynolds number of the fluid, $R_S$ is a first thermal transfer resistance between the heating means and a surface of the sensor element, $R_f = (h \cdot A)^{-1}$ is a second thermal transfer resistance between a surface of the sensor element and the fluid, h is a flow-dependent heat transfer coefficient between the sensor element and the fluid and A is a contact surface between the sensor element and the fluid is and/or
 b) the control and evaluating processor unit comprises calibration means for carrying out the first and second step.

10. The device as claimed in claim 8, wherein:

a) the sensor element has an electric heating wire with a temperature-dependent resistance, which can be operated simultaneously as heating means and as sensor means and/or b) the sensor element has a heat capacity Cs and a first thermal transfer resistance $R_S$ between the heating means and a surface of the sensor element, wherein the threshold value time or measuring duration is $t_S > C_S \cdot R_S$, in particular $t_S > 10 \cdot R_S$, and/or c) the sensor element has a cylindrical shape with a diameter (d) and which has, when the fluid flows laterally against it with the flow rate (v), has by approximation a flow-dependent heat transfer coefficient $h = \lambda/d \cdot 1.11 \cdot C \cdot Pr^{0.31} \cdot Re^m$, wherein $\lambda$ is a heat conductivity of the fluid, C is a parameter and m is an exponent, which depend on a Reynolds number Re of the fluid, and Pr is a Prandtl number of the fluid.

11. The method as claimed in any of claims 1 and 2, wherein the build-up dynamics (P(t)) is selected to be proportional to a time-independent amplitude factor $(1+R_S/R_f)^{-1}$, wherein $R_S$ is a first thermal transfer resistance between the heating means and a surface of the sensor element and $R_f = (h \cdot A)^{-1}$ is a second thermal transfer resistance between the surface of the sensor element and the fluid, wherein h is a flow-dependent heat transfer coefficient between the sensor element and the fluid and A is a contact surface between the sensor element and the fluid.

12. The method as claimed in claim 11, wherein a cylindrical sensor element, against which the fluid is transversely flown, is selected with a heat transfer coefficient h proportional to $v^m$ and with a second thermal transfer resistance $R_f = \gamma \cdot v^{-m}$, $\gamma$ being a constant.

13. The method as claimed in claim 11, wherein a) in a first step discrete values of the flow rate ($v_i$) are selected and corresponding build-up dynamics $P_i(t)$ of the heating power are determined, wherein i=1, 2, 3, ... is an index, b) in a second step a set of calibration curves of the threshold value time ($t_S$) as a function of the flow rate (v) is determined for the build-up dynamics ($P_i(t)$) and c) in a third step, on account of a previously measured flow rate or based on a-priori information about the presumed flow rate, a preferred calibration curve is selected according to a desired measuring precision for the flow rate (v) and according to a desired measuring duration ($t_S$), and is used to determine the flow rate (v), or d) in a third step, starting from the calibration curve associated with the lowest flow rate value ($v_{i=1}$) and rising successively to higher flow rate values ($v_{i>1}$) or by estimating in a single step, a preferred calibration curve is determined according to a desired measuring precision for the flow rate (v) and according to a desired measuring duration ($t_S$), and is used to determine the flow rate (v).

14. The method as claimed in claim 13, wherein a number and distribution of the calibration curves are selected according to a desired measuring resolution and to a desired measuring range of the flow rate (v).

15. The method as claimed in claim 11, wherein $R_S/R_f < 1$, preferably $R_S/R_f < 0.1$ and particularly preferred $R_S/R_f < 0.01$, and a heating power factor $P_0$ are selected and the threshold value time ($t_S$) is calculated as an exact linear function of the flow rate (v) according to an equation $$t_S(v) = (T_S - T_F)^{1/m} \cdot (P_0 \cdot \gamma)^{-1/m} \cdot v,$$

wherein $\gamma$ is a constant and $T_F$ is an undisturbed fluid temperature.

* * * * *